April 1, 1952  O. L. ALLEN  2,591,490
AIR FILTER
Filed March 1, 1946  2 SHEETS—SHEET 1

INVENTOR.
OLIVER L. ALLEN
BY
A. T. Sperry
ATTORNEY.

April 1, 1952     O. L. ALLEN     2,591,490
AIR FILTER

Filed March 1, 1946                        2 SHEETS—SHEET 2

INVENTOR.
OLIVER L. ALLEN
BY *R. T. Sperry*
ATTORNEY

Patented Apr. 1, 1952

2,591,490

UNITED STATES PATENT OFFICE 2,591,490

AIR FILTER

Oliver L. Allen, Riverside, Conn., assignor to Electrolux Corporation, Old Greenwich, Conn., a corporation of Delaware Application March 1, 1946, Serial No. 651,197

3 Claims. (Cl. 183—45)

The present invention relates to an article comprising a pad or layer of flexible material united to a stiffening rim.

The article of manufacture of the present invention which is illustrative of one of the many applications of the inventive concept comprises a flexible body having a relatively rigid peripheral edge. The present invention concept embraces many shapes and sizes of such articles, which may be used for many purposes, as for instance, circular air filters, such as used in vacuum cleaners to which the specific structural embodiment of the present application is directed.

In the art of fabricating articles which involve the joining of relatively flexible members to relatively rigid ones, the methods most usually employed involve intermediary means, such as stitching, tying, tacking, riveting, or gluing, each of which involve intermediate materials, such as the thread, string, tacks, rivets, or adhesive, as well as requiring the intermediate act of joining the members by such materials. In articles made by such procedure, the ultimate strength and life of the article is, of course, directly dependent upon the efficiency and effectiveness of the intermediary securement.

It is among the objects of the invention to provide an article which includes a relatively flexible member and a relatively rigid member united without intermediary means of the type referred to.

More specifically, it is an object of the present invention to provide an article having a flexible body and an integrally joined rigid frame or support formed in situ thereon.

A still more specific object of the present invention is to provide a filter or the like, such as used in vacuum cleaners, which comprises a flexible filter body and rigid integrally formed rim.

Numerous other objects and features of the present invention will be apparent from a consideration of the following specification when taken in conjunction with the accompanying drawings in which.

Figures 1, 2:
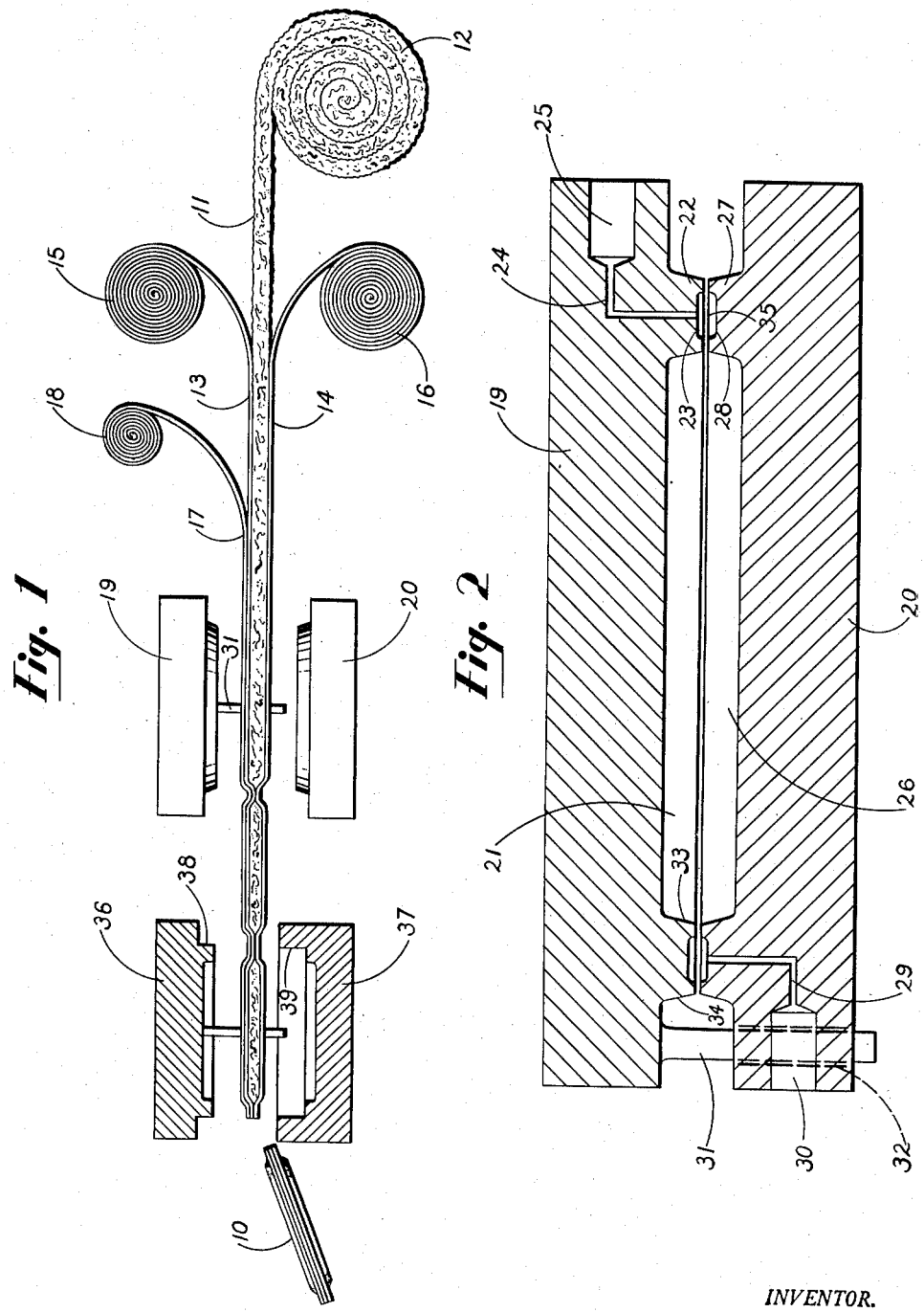
Fig. 1 is a view showing one manner of forming an article in accordance with the present invention, the article formed being the air filter illustrated in Figs. 3 and 4.
Fig. 2 is a transverse section of a die shown in Fig. 1.

With reference to the drawings, it will be seen that the air filter which is selected as representative of articles formed in accordance with the present invention is generally indicated by the numeral 10 and is formed of a central pad of filtering material 11 which is supplied in strip form from the roll 12. As the strip of filtering material is fed to the left as shown in Fig. 1, upper and lower covering material strips 13 and 14, respectively, are supplied to either face of the strip 11 from rolls 15 and 16. A narrow handle strip 17 is applied to the top sheet 13 from the roll 18 and the materials thus assembled are fed between upper and lower die members 19 and 20, respectively, the details of which are shown in Fig. 2.

The upper die member 19 is provided with a central hollow 21 bounded by an annular depending flange 22. The central portion of flange 22 is provided with an annular recess 23 and communicates as by a duct 24 with passage 25 which is adapted to communicate by suitable means with a supply of rim forming material. The lower die 20 is formed with a similar hollow 26 bounded by an annular flange 27 which is recessed as at 28 in registration with the recess 23 of the flange 22. The recess 28 also communicates by way of a duct 29 with an inlet passage 30 also suitably communicating with a source of supply of rim forming material. A guide pin 31 is preferably carried by the upper die 19 and is guided in an opening 32 in the lower die member 20 so as to maintain proper registration of the die members. When the dies are closed as in Fig. 2, it will be seen that the contacting edges of the die flanges form concentric mating edges 33 and 34 which bound the space 35 formed by the recesses 23 and 28 which space communicates with the source of supply of the material for the rim. After the correlated strips 11, 13, 14, and 17 pass through the die member and have applied thereto the rim material, as will be hereinafter described, the strip passes between upper and lower cutting dies 36 and 37. The cutting edge 38 of the upper die 36 cooperates with the cutting edge 39 of the lower die 37 to sever the formed filter from the strip material, the severance being preferably through the outer edge of the rim material to insure a smooth periphery on the finished filter. If desired, however, a further smoothing operation may be used to insure an even contour for the finished article.

With specific reference to Fig. 2 and the method of forming the rim, it will be seen that as the die closes, the strips are loosely held in the central chamber formed by the hollows 21 and 26, while the surfaces 33 and 34 compress the material in concentrically spaced rings to seal the chamber 35. Thereafter liquid rim forming material is injected from the passages 25 and 30 through the ducts 24 and 29 to fill the space 35 and imbed portion of the strips in the space 35 in such material. While the rim forming material may be of a wide variety of hardening substances, it has been found that a plastic of the Bakelite type may be advantageously used in which case the dies are heated by any suitable means so as to cause the rim forming material to set. In the present practice of the present invention, the material selected is the thermosetting plastic polyesterstyrene and the dies are heated to approximately 250° Fahrenheit and retained closed for about ¾ of a minute whereupon the material is hardened to a rigid annular ring encasing the material of the strip therein. The shearing action of the dies 36 and 37 leaves the filter with a rigid rim formed in situ thereon without requiring the use of any further securing operations or devices.

Figure 3:
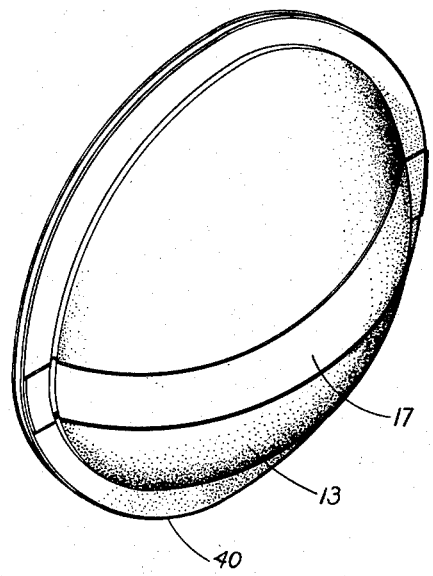
Fig. 3 is a perspective view of the air filter shown as produced in the manner depicted in Fig. 1.
Figure 4:
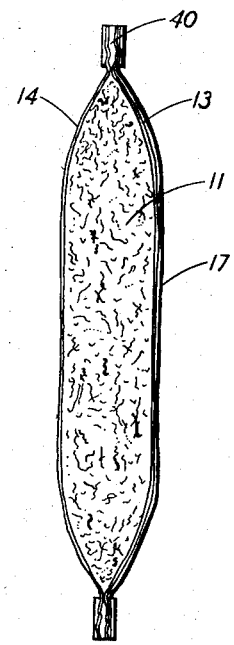
Fig. 4 is a sectional view of the filter of Fig. 3.

As seen in Figs. 3 and 4, the article in finished form has the central bat of filtering material 11 such as cotton or the like encased within the upper and lower sheets 13 and 14 of porous fabric and the handle 17 extends across the face. The rim 40 is formed by the rim forming material as hereinbefore set forth and has imbedded therein and firmly secures the edges of the material and the ends of the handle in a rigid framework.

Throughout the specification the term fabric is used in reference to sheet material formed from fibers as by felting, knitting or weaving in contradistinction to sheet material formed from impervious strands of solid material, such as wire. Thus, the materials here contemplated are composed of fibers which may be impregnated and wet by the liquid thermosetting material so that such material may enter the interstices of the fibers themselves to insure proper bonding when the thermosetting material is hardened.

While the method specifically set forth herein embraces the strip feeding of the materials and the application to each side of the strip of the plastic material which seeps through the material impregnating it and bonding it in the plastic, the inventive concept is by no means limited to this specific method. If desired, the materials may be pre-cut before the plastic is molded thereto and if desired, the plastic material may surround the edges and imbed them. In such instance, the porosity of the covering material is of no importance and the invention may thus be applied where the flexible material is impervious to the plastic. Obviously in so applying the present method, the article produced will vary accordingly. Numerous other changes and modifications of the invention may be resorted to without departure from the spirit or scope of the invention as outlined in the appended claims.

What I claim is:

1. An air filter comprising a layer of flexible compressible fibrous material, a cover sheet of flexible fabric on at least one side of said layer, the peripheral edge portion of said layer being compressed against the peripheral edge portion of said cover sheet, and a stiffening rim of set plastic material bonded to and bonding together said edge portions.

2. An air filter comprising an inner layer of flexible compressible fibrous material, a cover sheet of flexible fabric on each side of said inner layer, the peripheral edge portion of said inner layer being compressed between peripheral edge portions of said cover sheets, and a stiff rim of set plastic material bonded to and bonding together all of said edge portions.

3. An air filter comprising an inner layer of flexible compressible fibrous material, a cover sheet of flexible fabric on each side of said inner layer, the peripheral edge portions of said inner layer being compressed between peripheral edge portions of said cover sheets, a fabric tape extending across said filter adjacent to the outer side of one of said cover sheets, and a stiffening rim of set plastic material bonded to and bonding together all of said edge portions and the ends of said tape.

OLIVER L. ALLEN.

REFERENCES CITED

The following references are of record in the file of this patent:

UNITED STATES PATENTS

| Number | Name | Date |
| --- | --- | --- |
| 963,139 | Griffiths | July 5, 1910 |
| 1,586,868 | Webb | June 1, 1926 |
| 2,008,067 | Faber | July 16, 1935 |
| 2,055,853 | Schwartz | Sept. 29, 1936 |
| 2,127,397 | Freelander | Aug. 16, 1938 |
| 2,147,792 | Knight | Feb. 21, 1939 |
| 2,156,857 | Kroenlein | May 2, 1939 |
| 2,232,640 | Schwartzman | Feb. 18, 1941 |
| 2,241,229 | Williams | May 6, 1941 |
| 2,316,891 | Rowe | Apr. 20, 1943 |
| 2,348,287 | Fiekers | May 9, 1944 |
| 2,391,215 | Zabel et al. | Dec. 18, 1945 |
| 2,394,208 | Schaaf | Feb. 5, 1946 |